United States Patent
Lee et al.

(10) Patent No.: US 9,552,063 B2
(45) Date of Patent: Jan. 24, 2017

(54) ELECTRONIC DEVICE INCLUDING TRANSPARENT DISPLAY AND METHOD OF CONTROLLING THE ELECTRONIC DEVICE

(71) Applicant: SAMSUNG ELECTRONICS CO., LTD., Suwon-si (KR)

(72) Inventors: Yong Beom Lee, Seoul (KR); Seon Min Rhee, Seoul (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/551,478

(22) Filed: Nov. 24, 2014

(65) Prior Publication Data

US 2015/0154801 A1 Jun. 4, 2015

(30) Foreign Application Priority Data

Nov. 29, 2013 (KR) .................. 10-2013-0147323

(51) Int. Cl.
*G06F 3/01* (2006.01)
*G06T 11/00* (2006.01)
*G09G 3/00* (2006.01)

(52) U.S. Cl.
CPC ............ *G06F 3/013* (2013.01); *G06T 11/00* (2013.01); *G09G 3/003* (2013.01); *G06T 2210/62* (2013.01); *G09G 2320/028* (2013.01); *G09G 2354/00* (2013.01)

(58) Field of Classification Search
CPC ............ G09G 2340/10; G09G 2340/12; G06T 2210/62; G06T 2207/20212; G06T 19/006; G02B 27/017; G02B 2027/0178
See application file for complete search history.

(56) References Cited

U.S. PATENT DOCUMENTS

| 2002/0044152 A1* | 4/2002 | Abbott, III ............ G06T 19/006 345/629 |
| 2002/0167536 A1 | 11/2002 | Valdes et al. |
| 2005/0253877 A1* | 11/2005 | Thompson ............ G09G 3/3611 345/698 |

(Continued)

FOREIGN PATENT DOCUMENTS

| JP | 2002-024856 A | 1/2002 |
| KR | 10-2009-0047889 A | 5/2009 |

(Continued)

*Primary Examiner* — Antonio A Caschera
(74) *Attorney, Agent, or Firm* — NSIP Law

(57) ABSTRACT

A method of controlling an electronic device having a transparent display. The method includes controlling the electronic device to provide a first image through an optical display mode operation of the transparent display in which light incident from an object is transmitted, controlling the electronic device to acquire a second image through a video display mode operation of the transparent display in which an image captured from the object is displayed, and selectively displaying the first and second images using the transparent display by a mixing, by the electronic device, of the first and second images. The mixing may be dependent on a distance between the electronic device and the object or a display ratio between the first and second images. An image for an object may be displayed in a region of interest and an image for another object in a remaining region.

37 Claims, 15 Drawing Sheets

(56) References Cited

U.S. PATENT DOCUMENTS

| | | |
|---|---|---|
| 2009/0128449 A1 | 5/2009 | Brown et al. |
| 2011/0158478 A1* | 6/2011 | Yamada ............... G02B 6/0006 382/103 |
| 2012/0113140 A1 | 5/2012 | Hilliges et al. |
| 2012/0120103 A1* | 5/2012 | Border ................ G02B 27/017 345/633 |
| 2012/0242865 A1 | 9/2012 | Vartanian et al. |
| 2012/0293325 A1 | 11/2012 | Lahcanski et al. |
| 2012/0299950 A1 | 11/2012 | Ali et al. |
| 2013/0094682 A1 | 4/2013 | Lee et al. |

FOREIGN PATENT DOCUMENTS

| | | |
|---|---|---|
| KR | 10-1036600 B1 | 5/2011 |
| KR | 10-2011-0104379 A | 9/2011 |
| KR | 10-2012-0067854 A | 6/2012 |

\* cited by examiner

ELECTRONIC DEVICE INCLUDING TRANSPARENT DISPLAY AND METHOD OF CONTROLLING THE ELECTRONIC DEVICE

CROSS-REFERENCE TO RELATED APPLICATION

This application claims the priority benefit of Korean Patent Application No. 10-2013-0147323, filed on Nov. 29, 2013, in the Korean Intellectual Property Office, the disclosure of which is incorporated herein by reference.

BACKGROUND

1. Field

One or more example embodiments of the following description relate to an electronic device including a transparent device and a method of controlling the electronic device, and more particularly, to an electronic device including a transparent display configured to allow light incident from a rear surface of an electronic device to pass and to concurrently display a graphic image, and a method of controlling the electronic device.

2. Description of Related Art

Currently, the development of technology using a transparent display is actively ongoing. The term transparent display refers to a display capable of allowing light incident from a rear surface of an electronic device to pass and that may also display a graphic image.

A user may observe the light incident from the rear surface of the electronic device through the transparent display and may also observe the graphic image displayed on the transparent display.

Due to the aforementioned features, the transparent display may be used for an augmented reality service. The augmented reality service may refer to a service that provides additional information about the object being observed by the user. For example, when the user is observing the object through the transparent display, information about the object may be additionally displayed on the transparent display. Accordingly, the user may be simultaneously provided with the object and information about the object.

An augmented reality service may include a type of video-based augmented reality and a type of optical-based augmented reality. The term video-based augmented reality refers to a method of simultaneously displaying a screen photographed by an electronic device and information on the screen. The term optical-based augmented reality refers to a method of enabling a user to recognize a foreground displayed after having passed through the transparent display, in addition to relevant information, by displaying the relevant information on the transparent display.

In the case of the above transparent display, a transmittance of light may vary based on a distance from an object and thus, a transmittance of light from an object disposed at a relatively great distance may be significantly degraded.

SUMMARY

The foregoing and/or other aspects are achieved by providing a method of controlling an electronic device including a transparent display, the method including: acquiring a first image based on an optical display mode in which light incident from an object is transmitted; acquiring a second image based on a video display mode in which an image captured from the object is displayed; and displaying the first image and the second image on the transparent display by mixing the first image and the second image.

The displaying of the first image and the second image may include displaying the first image and the second image by mixing the first image and the second image based on a display ratio between the first image and the second image.

The displaying of the first image and the second image may include displaying the first image and the second image by adjusting a display brightness of the first image and a display brightness of the second image based on the display ratio.

The displaying of the first image and the second image may include increasing the display brightness of the second image when increasing the display ratio of the second image and decreasing the display brightness of the second image when increasing the display ratio of the first image.

The first image may be an image in which an additional rendering effect is further applied on the transparent display, and the displaying of the first image and the second image may include displaying the first image and the second image by adjusting a display brightness of the additional rendering effect and the display brightness of the second image.

The method of controlling the electronic device may further include measuring a distance between the electronic device and the object.

The displaying of the first image and the second image may include determining the display ratio based on the distance between the electronic device and the object.

The displaying of the first image and the second image may include increasing the displaying brightness of the second image according to an increase in the distance between the electronic device and the object and decreasing the display brightness of the second image according to a decrease in the distance between the electronic device and the object.

The displaying of the first image and the second image may include displaying the second image when the distance between the electronic device and the object exceeds a first threshold, and displaying the first image when the distance between the electronic device and the object is less than a second threshold.

The acquiring of the first image may include applying an additional rendering effect on the transparent display configured to allow the light incident from the object to pass.

The acquiring of the second image may include photographing the object.

The method of controlling the electronic device may further include further displaying an additional image associated with the object on at least one of the first image and the second image.

The method of controlling the electronic device may further include outward-photographing the object; inward-photographing a gaze of a user; and determining the gaze of the user based on an image captured through inward-photographing, and controlling a viewpoint of outward-photographing and a viewpoint of the user to be matched.

The method of controlling the electronic device may further include outputting a notification message when the gaze of the user is outside a predetermined inward-photographing range.

The displaying of the first image and the second image may include displaying the first image on a region of interest of the transparent display and displaying the second image on a remaining region of the transparent display.

The method of controlling the electronic device may further include receiving a designation on the region of interest. The displaying of the first image and the second image may include displaying the first image on the designated region of interest.

The method of controlling the electronic device may further include inward-photographing a gaze of a user. The displaying of the first image and the second image may include determining a point corresponding to the gaze of the user as the region of interest.

The foregoing and/or other aspects are achieved by providing an electronic device, including a transparent display configured to allow light incident from an object to pass, and to display at least one image; an outward-photographing unit configured to photograph the object; and a controller configured to acquire a first image based on an optical display mode in which the light is transmitted, to acquire a second image based on a video display mode in which an image captured from the object is displayed, and to control the transparent display to display the first image and the second image on the transparent display by mixing the first image and the second image.

The controller may be configured to control the transparent display to display the first image and the second image by adjusting a display brightness of the first image and a display brightness of the second image based on a display ratio between the first image and the second image.

The controller may be configured to control the transparent display to display the first image on a region of interest of the transparent display, and to display the second image on a remaining region of the transparent display.

The foregoing and/or other aspects are achieved by providing an electronic device, including a transparent display, configured to allow light incident from an object to pass through the transparent display, and to display at least one image, a distance measurer to measure a distance between the electronic device and the object, and a controller to display, on the transparent display, a first image based on an optical display mode and a second image based on a video display mode by mixing the first image and the second image based on a display ratio between the first image and the second image that is determined based on the distance between the electronic device and the object measured by the distance measurer.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1A:
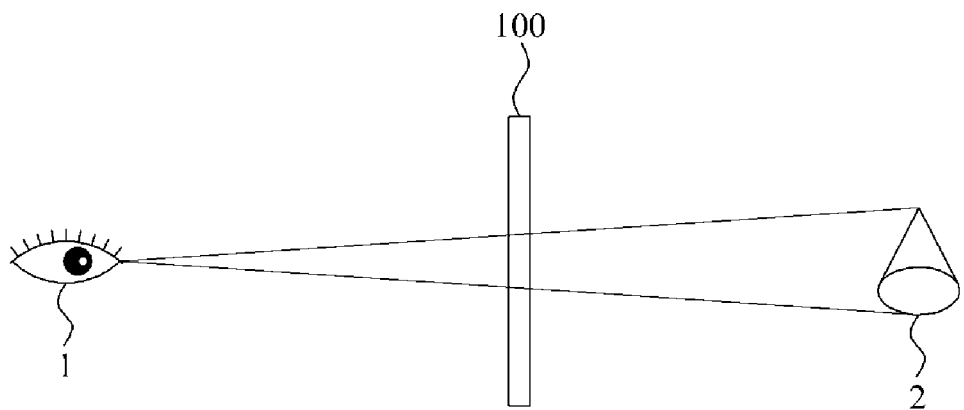
FIGS. 1A, 1B, 1C, 1D, and 1E illustrate examples of a transparent display provided in an electronic device according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

FIGS. 1A through 1E illustrate examples of a transparent display 190 provided in an electronic device 100 according to example embodiments.

Figure 1B:
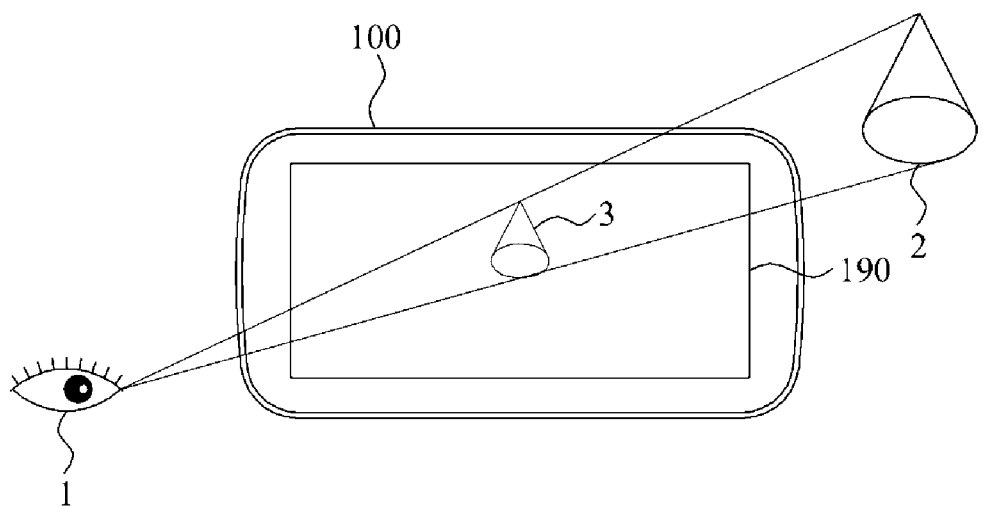
Figure 1C:
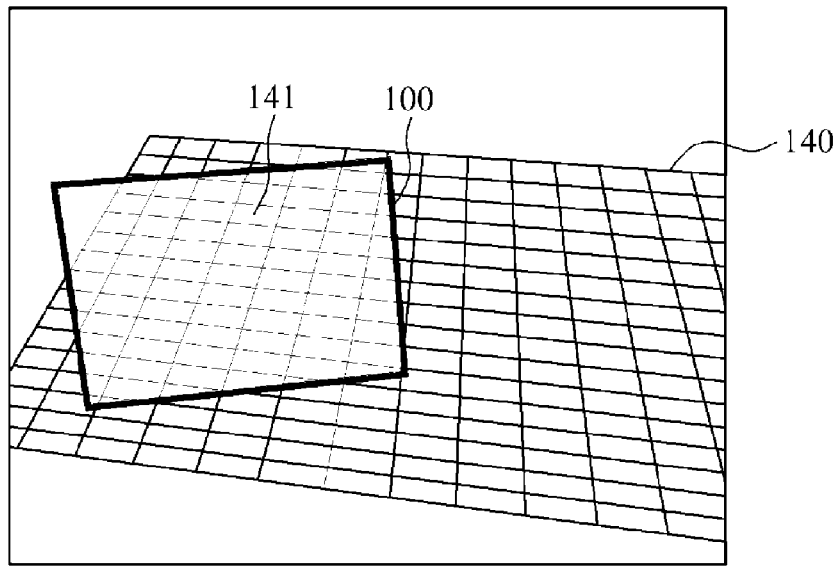

Referring to FIGS. 1A and 1B, the electronic device 100 may include the transparent display 190. The transparent display 190 may allow light incident from a rear surface of the electronic device 100 to pass towards a front surface of the electronic device 100. For example, an object 2 may emit scattering light by natural light or indoor light to surroundings.

The scattering light emitted from the object 2 may be incident on a rear surface of the transparent display 190, and the transparent display 190 may allow the incident light to pass towards a front surface of the transparent display 190. In this example, the transparent display 190 may allow light incident to one surface to be transmitted to another surface. Rendering data may be displayed on the transparent display 190. Accordingly, a user 1 may recognize the object 2 through the transparent display 190. In detail, the user 1 may recognize the scattering light from the object 2 that has passed through the transparent display 190, and may observe the object 2 on a portion of the transparent display 190. The portion of the transparent display 190 on which the user 1 is observing the object 2 may be variously changed based on a position of a visual field of the user 1, and may correspond to an intersecting point between a gaze of the user 1 towards the object 2 and the transparent display 190.

Even though an image is not currently being actively displayed on the transparent display 190, the transparent display 190 may enable a user to recognize an object by allowing the light from the rear surface to pass towards the front surface. The transparent display 190 may be embodied using a variety of technologies, such as a projection display and a direct view display, for example. The projection display may be driven using, for example, a projection method, and the direct view display may be driven using a method in which a display, such as a thin film transistor (TFT) liquid crystal display (LCD) and an active matrix organic light emitting diode (AMOLED), for example, is transparent. A further detailed operation and structure of the transparent display 190 may not be directly related to the present disclosure and thus, a description related thereto is omitted.

As described above, the transparent display 190 may display an object by allowing the scattering light incident to the rear surface to pass through the display. Such a display mode may also be referred to as an optical display mode. The electronic device 100 including the electronic device 190 may further apply an additional rendering effect while displaying a first image based on the optical display mode. For example, the electronic device 100 may apply a blurring effect on at least a portion of the transparent display 190, or may apply an additional rendering effect of changing at least one of a color and a brightness. The display mode in which the electronic device 100 applies an additional rendering effect while allowing natural light from the object 2 to pass may also be referred to as the optical display mode.

Figure 10:
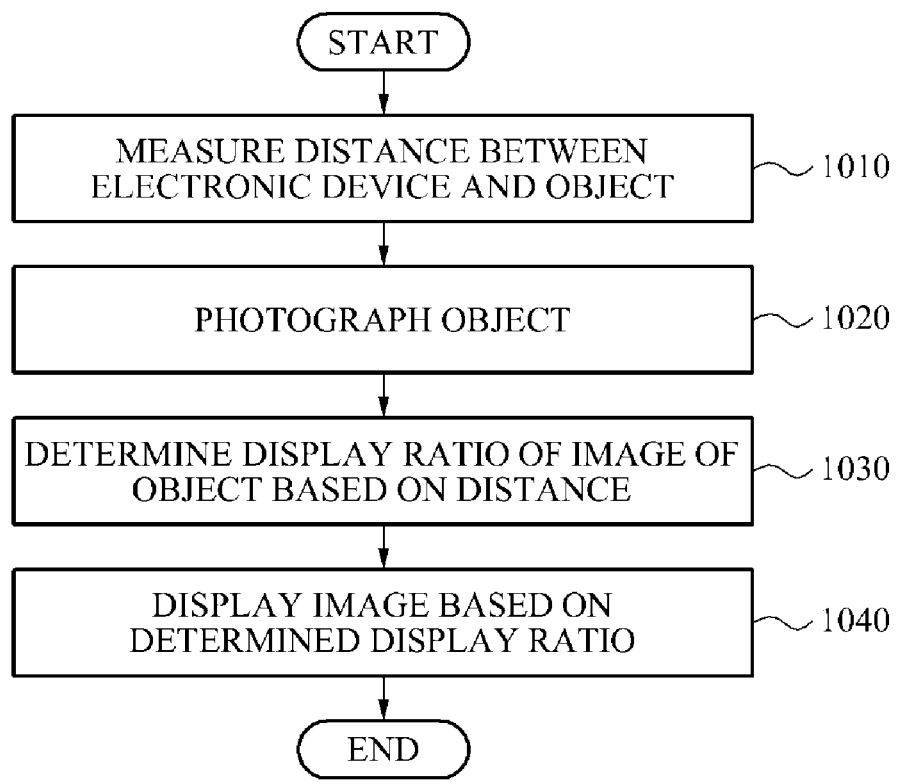
FIG. 10 is a flowchart illustrating a method of controlling an electronic device according to example embodiments.

Referring to FIG. 10, the electronic device 100 may allow light incident from an object 140 to pass as is. The electronic device 100 may also display a first image 141 in which a blurring effect is further applied. Due to the light incident from the object 140 and having passed through as is, an object on the transparent display 190 may be displayed to be geometrically continued from the object 140 disposed at the rear of the electronic device 100. Due to the burring effect applied by the electronic device 100, the user may recognize that the first image 141 is relatively blurred.

Figure 1D:
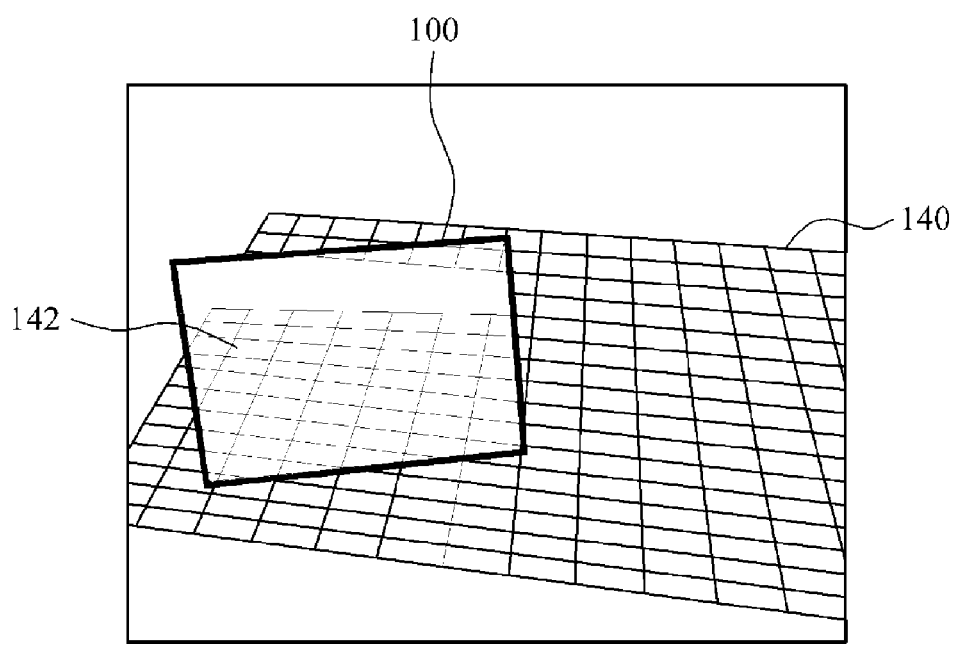

A display mode in which the electronic device 100 displays a captured image or a stored image on the transparent display 190 may be referred to as a video display mode. Referring to FIG. 1D, the electronic device 100 may display a second image 142 captured from the object 140. Due to the captured second image 142 displayed by the electronic device 100, an object on the second image 142 may be displayed to be geometrically discontinued from the object 140 disposed at the rear of the electronic device 100.

Figure 1E:
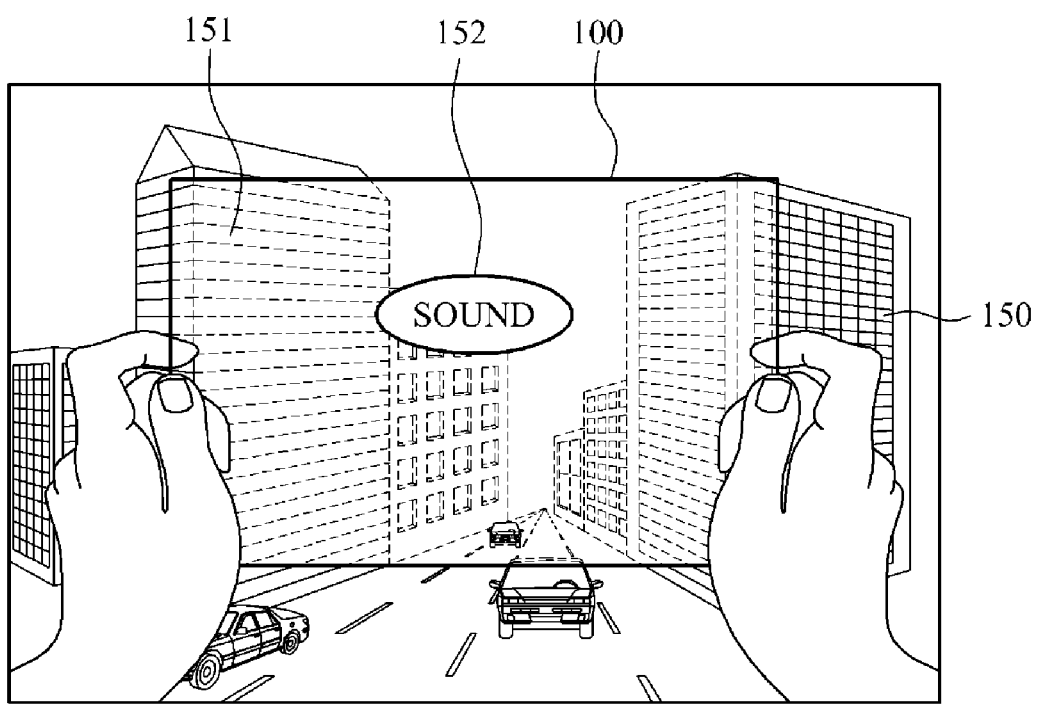

FIG. 1E illustrates an example of a first image according to example embodiments. Referring to FIG. 1E, the first image may include an image 151 by light incident from an object 150 and having passed and an additional image 152. The additional image 152 may refer to an image in which information on the object 150 is expressed, or may refer to an image associated with the electronic device 100.

The electronic device 100 may include a display and thus, may refer to a mobile electronic device, such as a smartphone, a tablet personal computer (PC), and a plasma display panel (PDP), for example. Alternatively, the electronic device 100 may be configured as a relatively large electronic device, such as a TV and a monitor, for example.

In an example in which the transparent display 190 is configured to have a size of 22 inches using a TFT-LCD method, the transparent display 190 may have a transmittance of about 15%. In an example in which the transparent display 190 is configured to have a size of 22 inches using an organic light emitting diode (OLED) method, the electronic device 190 may have a transmittance of about 48%.

Referring again to FIG. 1A, the transmittance perceived by the user 1 may significantly vary based on a distance between the electronic device 100 and the object 2. The transmittance of the transparent display 190 may be expressed by Equation 1.

$$\text{Transmittance} = \text{function}(\text{physical transmittance}, \text{rear space}) \quad [\text{Equation 1}]$$

The physical transmittance of Equation 1 may be expressed by Equation 2.

$$\text{Physical transmittance} = \text{function}(\text{size of transparent display panel, material}) \quad [\text{Equation 2}]$$

The rear space of Equation 1 may be expressed by Equation 3.

$$\text{Rear space} = \text{function}(\text{distance from object}) \quad [\text{Equation 3}]$$

Equation 1 through Equation 3 may be as expressed by Equation 4.

$$\text{Transmittance} = \text{function}(\text{physical transmittance}, \text{distance from object}) \quad [\text{Equation 4}]$$

For example, when a distance between the electronic device 100 and the object 2 is relatively far, the transmittance may be significantly degraded. When a size of the transparent display 190 is reduced, the transmittance may also be significantly degraded. Accordingly, when the electronic device 100 is manufactured in a relatively small size, such as a mobile electronic device, for example, and the object 2 is disposed at a relatively far distance, a transmittance degradation issue may arise.

Figure 2A:
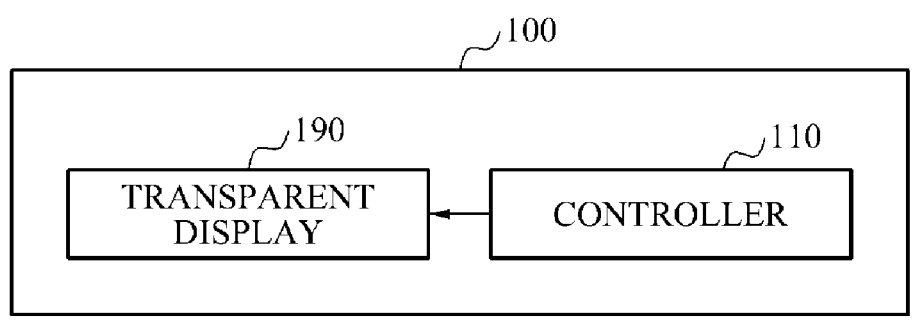
FIGS. 2A and 2B illustrate examples of a configuration of an electronic device according to example embodiments.

FIG. 2A illustrates an example of a configuration of the electronic device 100 according to example embodiments.

Referring to FIG. 2A, the electronic device 100 may include, for example, a controller 110 and the transparent display 190. The controller 110 may control the overall operation of the electronic device 100. The controller may execute a program or an application associated with an operation of the electronic device 100 that is stored in a storage (not shown), and may also output an execution result to various types of hardware within the electronic device 100. The controller 110 may be configured as hardware capable of performing an operation, such as a central processing unit (CPU) or a mini-computer, for example. Embodiments are not limited thereto, which may be easily understood by those skilled in the art.

The transparent display 190 may allow scattering light incident from an object to pass, and may display at least one image. For example, the transparent display 190 may display a first image based on an optical display mode and a second image based on a video display mode by mixing the first image and the second image according to a control of the controller 110.

That the transparent display 190 displays the first image based on the optical display mode may indicate that the transparent display 190 allows the scattering light from the object to pass through the transparent display 190 as is. For example, in the optical display mode, the controller 110 may control no rendering data to be displayed on the transparent display 190. Accordingly, the scattering light from the object may simply pass through the transparent display 190 and be transferred to a user.

The controller 110 may control an additional rendering effect to be applied and thereby displayed on the transparent display 190. For example, the controller 110 may control a blurring effect to be applied to at least a portion of the transparent display 190, or may control a color or a brightness to be changed on at least a portion of the transparent display 190. That the transparent display 190 displays the additional rendering effect while allowing the scattering light from the object to pass may also indicate that the transparent display 190 displays the first image based on the optical display mode.

The controller 110 may determine a display ratio between the first image based on the optical display mode and the second image based on the video display mode. The controller 110 may display the first image and the second image on the transparent display 190 by mixing the first image and the second image based on the determined display ratio. For example, the controller 110 may display a mixed image in which the first image and the second image are mixed at a display ratio by adjusting a display brightness of the second image.

Here, the display ratio may indicate, for example, a brightness ratio. The controller 110 may adjust a display ratio of the mixed image by adjusting a brightness of the second image. In detail, according to an increase in a display ratio of the second image compared to a display ratio of the first image, the controller 110 may further increase the display brightness of the second image based on the video display mode. According to an increase in the display brightness of the second image, a transmittance of the transparent display 190 may be degraded and the display brightness of the first image may be degraded. The controller 110 may adjust the display ratio between the first image and the second image by adjusting the brightness of the second image.

When the additional rendering effect is applied to the first image instead of simply allowing the scattering light from the object to pass, the controller 110 may adjust the display ratio between the first image and the second image by adjusting a brightness of the additional rendering effect and the display brightness of the second image. For example, when the display ratio of the second image is relatively high compared to the display ratio of the first image, the controller 110 may control the display brightness of the second image to be relatively high compared to the display brightness of the first image, for example, the display brightness of the additional rendering effect.

The display ratio may refer to a display area on the transparent display 190. For example, the controller 110 may control the first image to be displayed on a first region of the transparent display 190 and may control the second image to be displayed on a second region of the transparent display 190. For example, the controller 110 may control the first image to be displayed on a region of the transparent display 190 on which scattering light from the object intersects the transparent display 190 and may also control the second image to be displayed on a remaining region of the transparent display 190. An example of displaying a mixed image of the first image and the second image will be further described with reference to FIGS. 7A through 7H.

As an example, the controller 110 may determine a display ratio of the first image as "1" and may determine a display ratio of the second image as "0". In this example, the controller 110 may display only the first image and may not display the second image. As another example, the controller 110 may determine the display ratio of the first image as "0" and may determine the display ratio of the second image as "1". In this example, the controller 110 may display only the second image.

The controller 110 may display the first image and the second image by mixing the first image based on the optical display mode and the second image based on the video display mode using a variety of methods. Hereinafter, an example of determining a display ratio between the first image and the second image in the case of displaying the mixed image of the first image and the second image will be described.

Figure 2B:
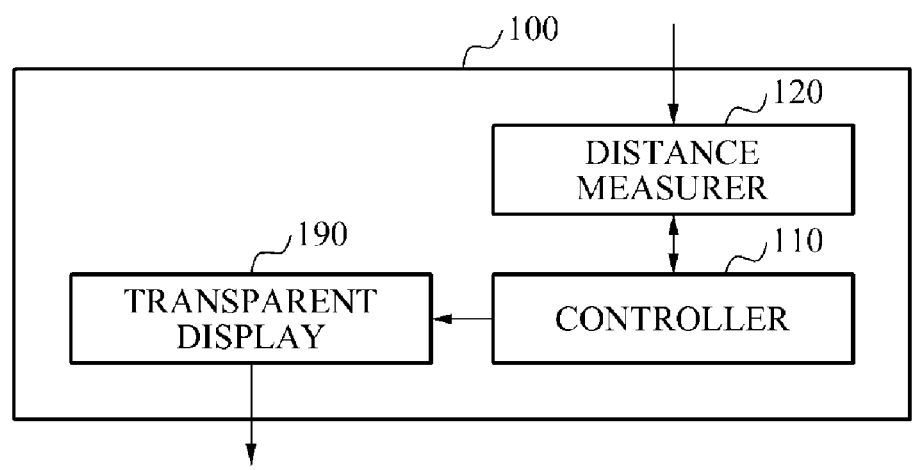

FIG. 2B illustrates another example of a configuration of the electronic device 100 according to example embodiments. Referring to FIG. 2B, the electronic device 100 may further include a distance measurer 120.

The distance measurer 120 may measure a distance between the electronic device 100 and a predetermined object. The distance measurer 120 may be configured as, for example, a time of flight (TOF) camera, a stereoscopic camera, a mono camera, and a proximity sensor.

When the distance measurer 120 is configured as the TOF camera, the distance measurer 120 may be disposed on a rear surface of the electronic distance 100 and may measure a distance from an object disposed at the rear of the electronic device 100. The distance measurer 120 may transmit, to the object, light having a predetermined wavelength and intensity. The distance measurer 120 may receive light reflected from the object, and may measure the distance between the electronic device 100 and the object based on an amount of time used from a point in time when the light is transmitted to a point in time when the light is received.

When the distance measurer 120 is configured as the stereoscopic camera, two cameras may be disposed on the rear surface of the electronic device 100 as the distance measurer 120. The two cameras may simultaneously photograph the object. The distance measurer 120 may measure the distance between the electronic device 100 and the object based on a difference between two images collected from the two cameras.

When the distance measurer 120 is configured as the mono camera, a single camera may be disposed on the rear surface of the electronic device as the distance measurer 120. The distance measurer 120 may acquire continuous image frames, may measure a displacement between features of two frames, and may measure the distance between the electronic device 100 and the object using a triangulation.

When the distance measurer 120 is configured as the proximity sensor, the distance measurer 120 may also measure the distance between the electronic device 100 and the object based on, for example, a change in a magnetic field, a change in capacitance, and a change in a LED measurement value, which occur due to the object.

The controller 110 may determine the display ratio between the first image of the optical display mode and the second image of the video display mode, based on the distance between the electronic device 100 and the object. For example, according to an increase in the distance between the electronic device 100 and the object, the controller 100 may increase a display ratio of the second image and may decrease a display ratio of the first image. Conversely, according to a decrease in the distance between the electronic device 100 and the object, the controller 100 may decrease the display ratio of the second image and may increase the display ratio of the first image. For example, by increasing a display brightness of the second image, the electronic device 100 may increase the display ratio of the second image and may decrease the display ratio of the first image. Also, when the first image includes an additional rendering effect, the electronic device 100 may increase the display ratio of the first image and may decrease the display ratio of the second image by increasing a display brightness of the first image.

When the distance between the electronic device 100 and the object exceeds a first threshold, the controller 110 may control the transparent display 190 to display only the second image. When the distance between the electronic device 100 and the object is less than a second threshold, the controller 110 may control the transparent display 190 to display only the first image.

The controller 110 may control the transparent display 190 to display an additional image associated with the object on a corresponding portion of the transparent display 190. As described above, the transparent display 190 may allow light incident from the object to pass. Accordingly, the user may observe the object on a predetermined portion of the transparent display 190. The controller 110 may control the transparent display 190 to display information about the object around the corresponding portion.

The controller 110 may determine a gaze of the user received from an inward-photographing unit (not shown). The controller 110 may determine the gaze of the user and may determine a predetermined portion of the transparent display 190 on which the user is capable of observing the object. The controller 110 may control the transparent display 190 to display information on the object around the predetermined portion.

An outward-photographing unit (not shown) may also photograph the object. The controller 110 may recognize the object photographed by the outward-photographing unit, and may acquire information on the object corresponding to the recognition result. For example, the controller 110 may acquire information on the object stored in a database or may acquire information on the object from an external source.

In the case of displaying the first image, the controller 110 may control the transparent display 190 to display only information on the object. For example, in the case of displaying the first image, the controller 110 may control an augmented reality service of an optical method to be provided.

In the case of displaying the second image, the controller 110 may control the transparent display 190 to display an image of the object captured by the outward-photographing unit and information on the object.

The controller 110 may recognize the object photographed by the outward-photographing unit, and may acquire information on the object corresponding to the recognition result. For example, the controller 110 may acquire information on the object stored in a database or may acquire information on the object from an external source.

The controller 110 may control the transparent display 190 to display the captured image of the object and information on the object based on a video display mode. The controller 110 may control the transparent display 190 to further display information on the object on the image of the object as an additional image.

For example, the controller 110 may control a video-based augmented reality service to be provided based on the video display mode.

The controller 110 may control the image of the object and information on the object to be corrected and displayed based on a gaze of the user photographed by the inward-photographing unit, which will be further described below.

Figure 3:
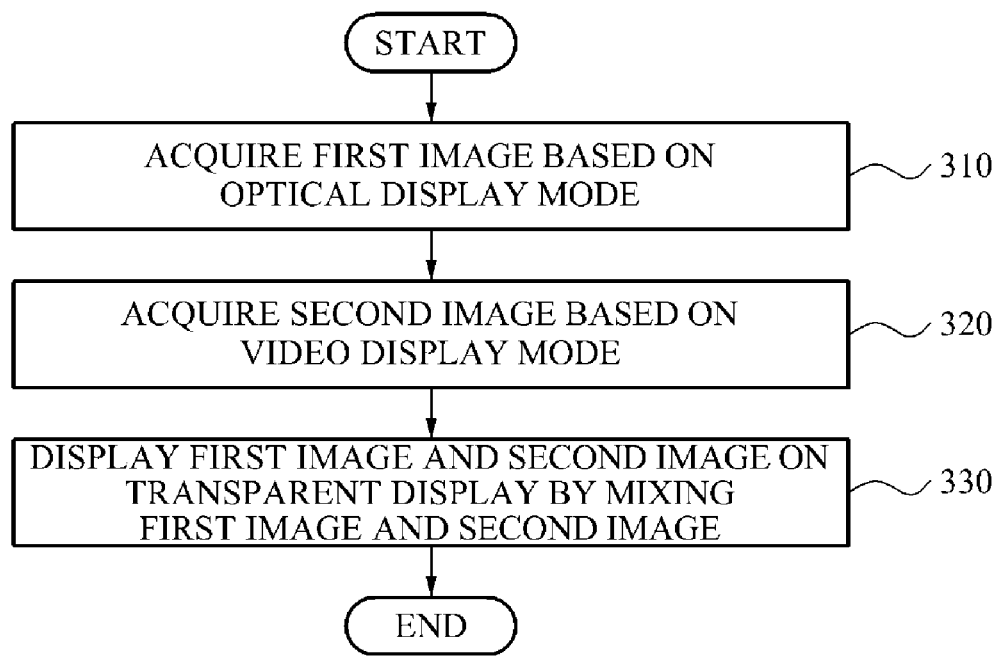
FIG. 3 is a flowchart illustrating a method of controlling an electronic device according to example embodiments.

FIG. 3 is a flowchart illustrating a method of controlling an electronic device according to example embodiments.

Referring to FIG. 3, in operation 310, the electronic device may acquire a first image based on an optical display mode. In detail, the electronic device may acquire light incident from an object and may allow the light to pass through a transparent display. Alternatively, the electronic device may receive the light incident from the object and may allow the light to pass through the transparent display, thereby further displaying an additional rendering effect.

In operation 320, the electronic device may acquire a second image based on a video display mode. For example, the electronic device may acquire an image of the object by photographing the object.

In operation 330, the electronic device may display the first image and the second image on the transparent display by mixing the first image and the second image. The electronic device may display the first image and the second image by mixing the first image and the second image based on a display ratio between the first image and the second image. As an example, the electronic device may display the first image and the second image by adjusting a display brightness of the first image and a display brightness of the second image based on the display ratio. As another example, the electronic device may display a mixed image of the first image and the second image by displaying the first image on a first region of the transparent display and by displaying the second image on a second region of the transparent display.

Figure 4A:
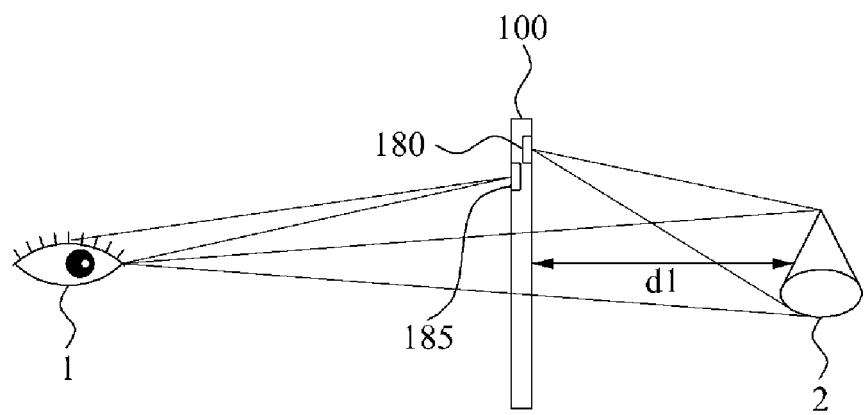
FIGS. 4A and 4B illustrate examples of displaying a first image based on an optical display mode according to example embodiments.
Figure 4B:
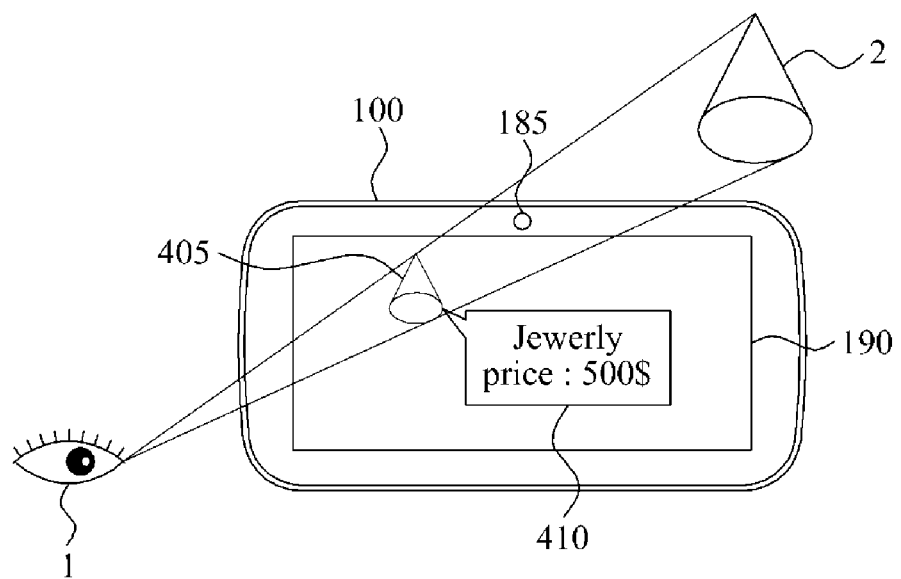

FIGS. 4A and 4B illustrate examples of displaying a first image based on an optical display mode according to example embodiments. Referring to FIGS. 4A and 4B, the object 2 is assumed to be separate from the electronic device 100 by a distance d1.

The position measurer 120 may measure a distance between the electronic device 100 and the object 2 as d1. An outward-photographing unit 180 may photograph the object 2 and an inward-photographing unit 185 may photograph a gaze of the user 1.

The controller 110 may determine that d1 is less than a certain threshold and accordingly, may determine that only the first image is to be displayed.

The controller 110 may recognize the object 2 photographed by the outward-photographing unit 180 and may acquire information on the object 2 corresponding to the recognition result.

The controller 110 may determine the gaze of the user 1 photographed by the inward-photographing unit 185. The controller 110 may match a viewpoint of the user 1 and a viewpoint of the outward-photographing unit 180 based on the determined gaze of the user 1. The controller 110 may also determine a position at which information on the object 2 is to be displayed, based on the determined gaze of the user 1.

Referring to FIGS. 4A and 4B, the user 1 may observe light from the object 2 that passes through the transparent display 190.

The controller 110 may display information about the object 2 on the transparent display 190. For example, the controller 110 may display information about the object 2, based on the gaze of the user 1 photographed by the inward-photographing unit 185.

Referring to FIG. 4B, the controller 110 may acquire information about the object 2, such as jewelry and prices of the jewelry, for example, and may control information about the object 2 to be displayed on the display panel 190 as indicated by a box 410. The controller 110 may control information on the object 2 to be displayed at a position corresponding to a position 405 at which the object 2 is being observed by the user 1.

Figure 5A:
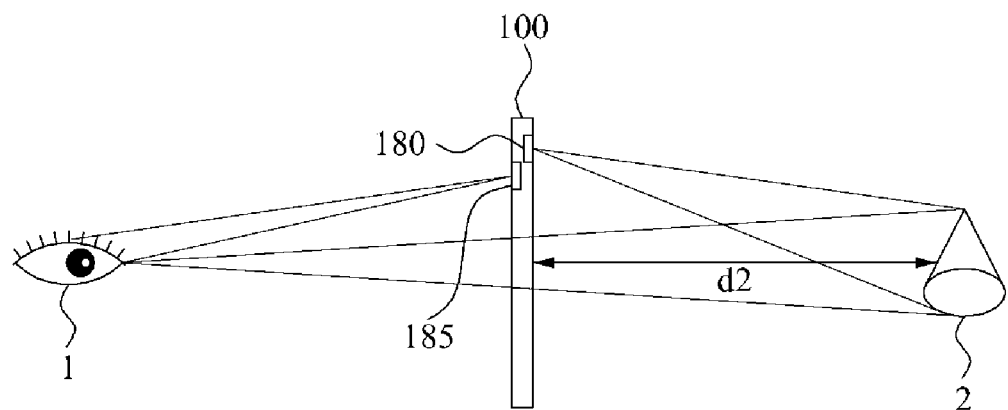
FIGS. 5A and 5B illustrate examples of displaying a second image based on a video display mode according to example embodiments.
Figure 5B:
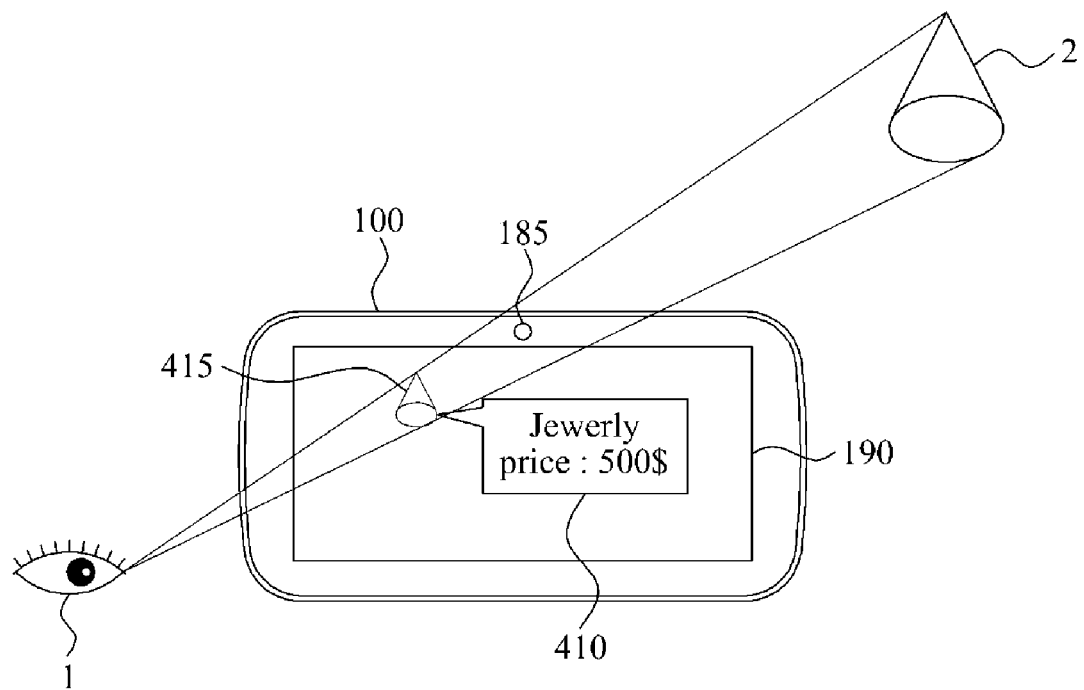

FIGS. 5A and 5B illustrate examples of displaying a second image based on a video display mode according to example embodiments. Referring to FIGS. 5A and 5B, the object 2 is assumed to be separated from the electronic device 100 by a distance d2.

The position measurer 120 may measure a distance between the electronic device 100 and the object 2 as d2. The outward-photographing unit 180 may photograph the object 2 and the inward-photographing unit 185 may photograph a gaze of the user 1.

The controller 110 may determine that d2 exceeds a threshold and accordingly, may determine that only the second image is to be displayed.

The controller 110 may recognize the object 2 photographed by the outward-photographing unit 180 and may acquire information on the object 2 corresponding to the recognition result.

The controller 110 may determine the gaze of the user 1 photographed by the inward-photographing unit 185. The controller 110 may match a viewpoint of the user 1 and a viewpoint of the outward-photographing unit 180 based on the determined gaze of the user 1.

Referring to FIGS. 5A and 5B, the controller 110 may control an image 415 captured from the object 2 to be displayed on the transparent display 190. The controller 110 may control information on the object 2 to be displayed at a position corresponding to a position 415 at which the object 2 is displayed on the transparent display 190.

As illustrated in FIG. 5, the controller 110 may acquire the information on the object and may control the information on the object to be displayed in box 410. For instance the information on the object may be a type of the object e.g. jewelry and a price of the object. In particular, the controller 110 may control the box 410 to be displayed corresponding to the position of the image 415.

Figure 6:
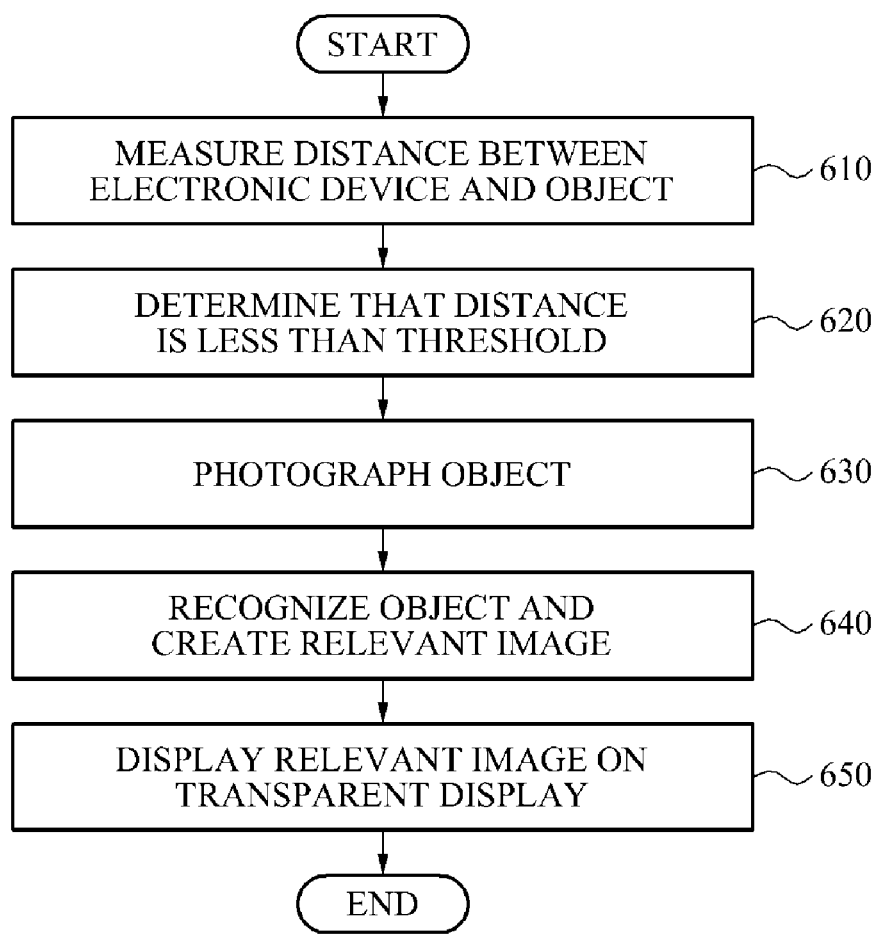
FIG. 6 is a flowchart illustrating a method of controlling an electronic device configured to display an optical display mode according to example embodiments.

FIG. 6 is a flowchart illustrating a method of controlling an electronic device configured to display an optical display mode according to example embodiments.

Referring to FIG. 6, in operation 610, the electronic device may measure a distance between the electronic device and an object. For example, the electronic device may measure the distance between the electronic device and the object, using a variety of methods, such as a TOF camera method, a stereoscopic camera method, a mono camera method, and a proximity sensor method, for example. However, the aforementioned methods are only examples and thus, it will be easily understood by those skilled in the art that the present disclosure is not limited thereto.

In operation 620, the electronic device may determine that the distance is less than a threshold such as a predetermined threshold.

In operation 630, the electronic device may outward-photograph the object using an outward-photographing unit.

In operation 640, the electronic device may recognize the object based on an image captured from the object and may create a relevant image corresponding to the recognition result. For example, as described above with reference to FIG. 4B or 5B, the electronic image may create an image that includes information, such as a type or prices of the object, for example.

The electronic device may acquire information on the object corresponding to the recognition result from an internal database or an external source. The electronic device may create an image based on the acquired information on the object or may receive an image corresponding to information about the object from the external source.

In operation 650, the electronic device may display an image corresponding to information on the object on the transparent display. For example, the electronic device may determine a position at which the object is being observed on the transparent display, based on the gaze of the user inward-photographed by the inward-photographing unit. The electronic device may display an image corresponding to information on the object at a position corresponding to the determined position.

Figure 7A:
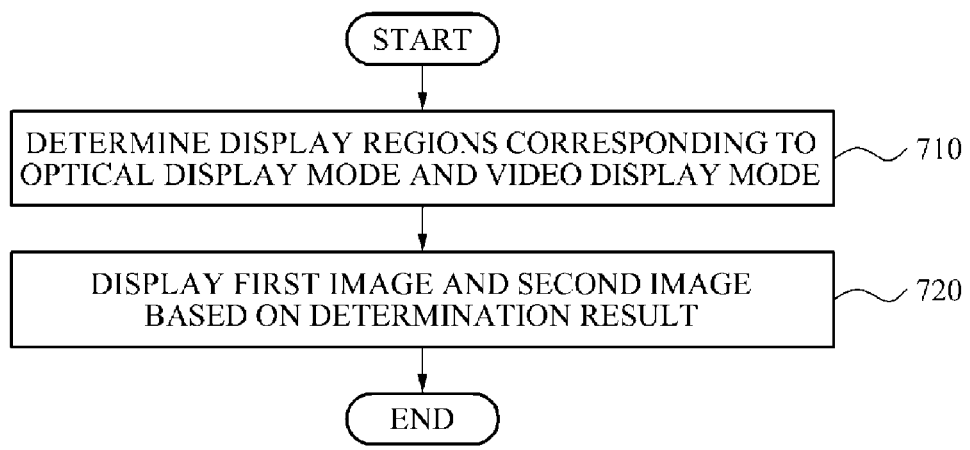
FIGS. 7A and 7B are flowchart illustrating a method of displaying a first image and a second image according to example embodiments.

FIG. 7A is a flowchart illustrating a method of displaying a first image and a second image according to example embodiments.

Referring to FIG. 7A, in operation 710, the electronic device may determine a region of a transparent display on which a first image based on an optical display mode is to be displayed and a region of the transparent display on which a second image based on a video display mode is to be displayed.

In operation 720, the electronic device may display the first image and the second image based on the determination result.

Figure 7B:
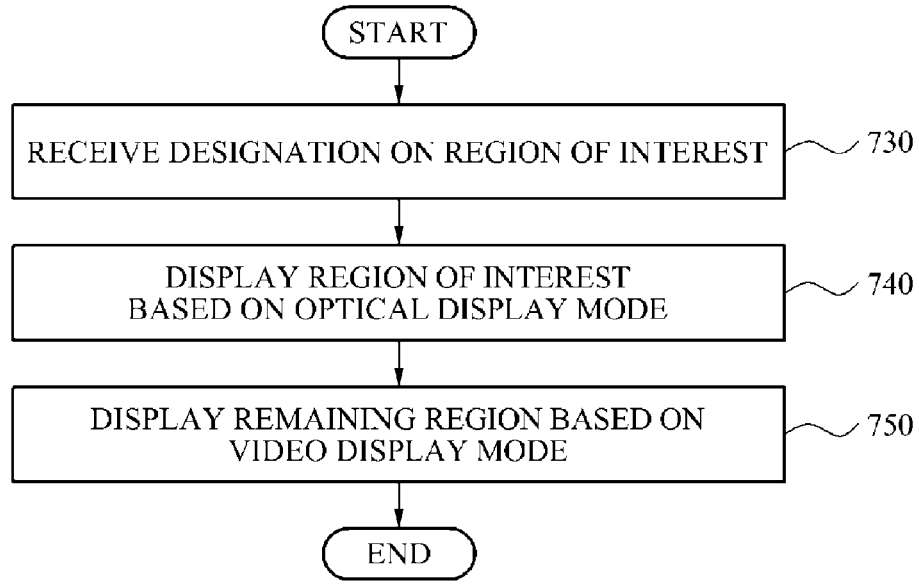
Figure 7C:
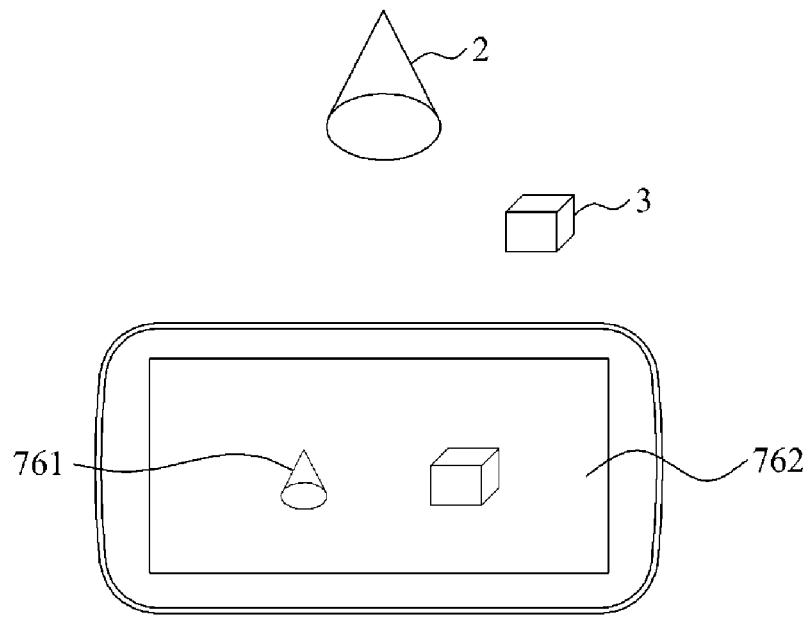
FIGS. 7C, 7D, 7E, 7F, 7G, and 7H illustrate examples of an electronic device according to example embodiments.

FIG. 7B is a flowchart illustrating a method of displaying a first image and a second image based on the determination result according to example embodiments. The method of FIG. 7B will be described with reference to FIGS. 7C through 7G.

In operation 730, the electronic device may receive a designation of a region of interest. For example, referring to FIG. 7C, an object 2 corresponding to a first object (hereinafter, the object 2 also referred to as the first object 2) and a second object 3 may be disposed at the rear of the electronic device. Scattering light from the first object 2 and the second object 3 may pass through the transparent display. A user may observe the first object 2 and the second object 3 through the transparent display. For example, the first object 2 may be observed at a first position 761 of the transparent display and the second object 3 may be observed at a second position 762 of the transparent display.

Figure 7D:
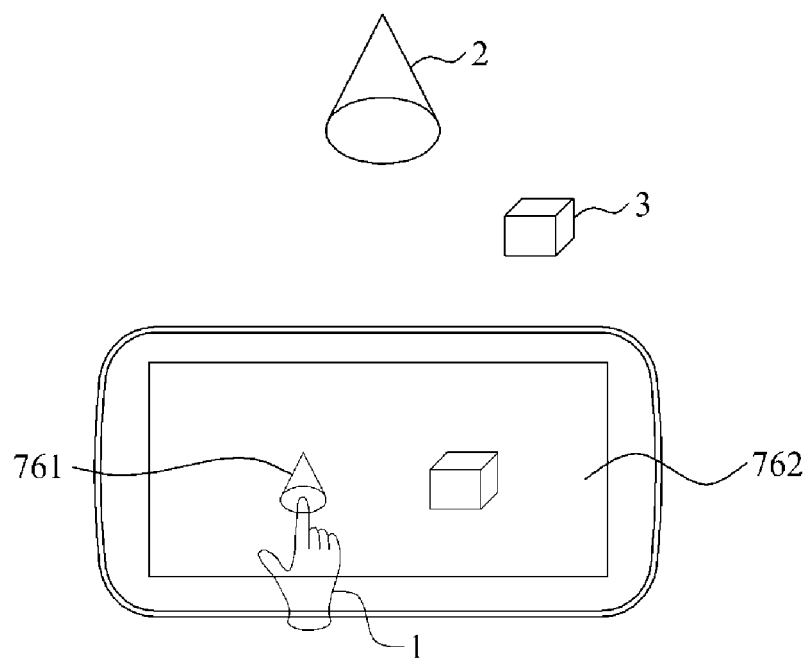

Referring to FIG. 7D, a user 1 may designate a region of interest. For example, the user 1 may designate a first region 761 as the region of interest.

Referring again to FIG. 7B, in operation 740, the electronic device may display the region of interest based on the optical display mode. For example, referring to FIG. 7E, the electronic device may control no rendering data to be displayed on the first region 761. Alternatively, the electronic device may control an additional rendering effect to be applied and displayed on the first region 761.

Figure 7E:
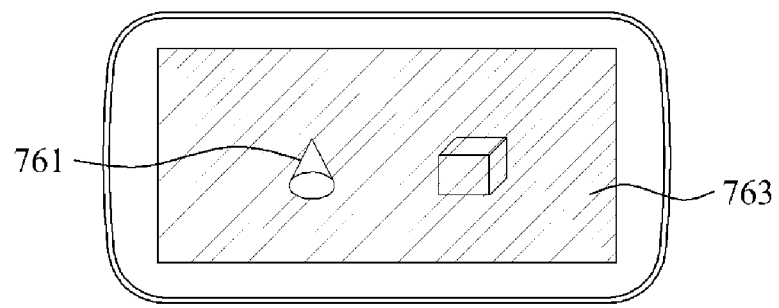

In operation 750, the electronic device may display a remaining region excluding the region of interest based on a video display mode. Referring to FIG. 7E, the electronic device may outward-photograph the second object 3 and may display a captured screen on a remaining region 763 excluding the first region 761. Here, an additional blurring effect may be processed on the captured screen.

A user may designate a portion of the transparent display to be displayed based on the optical display mode by designating the region of interest.

Figure 7F:
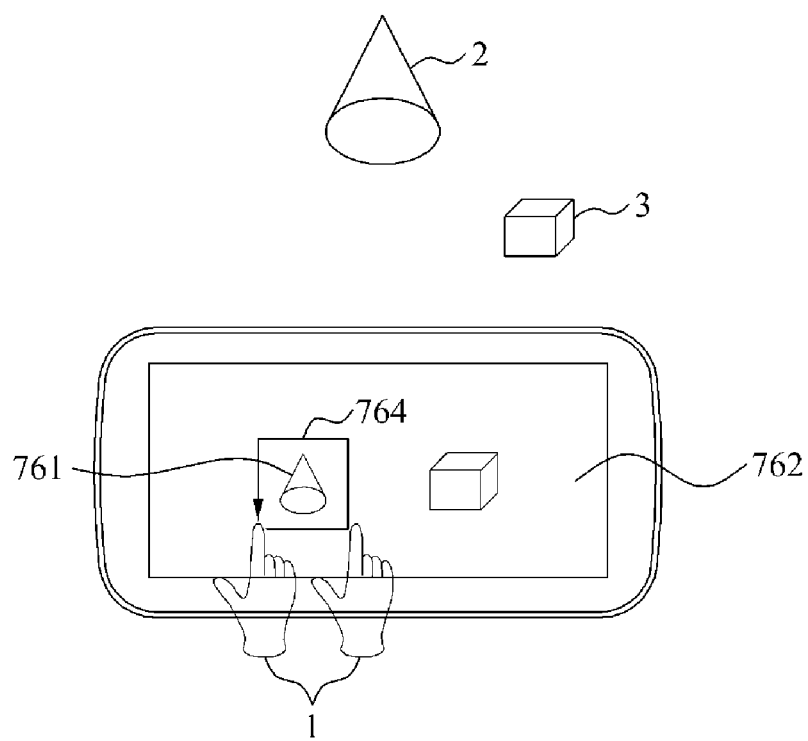
Figure 7G:
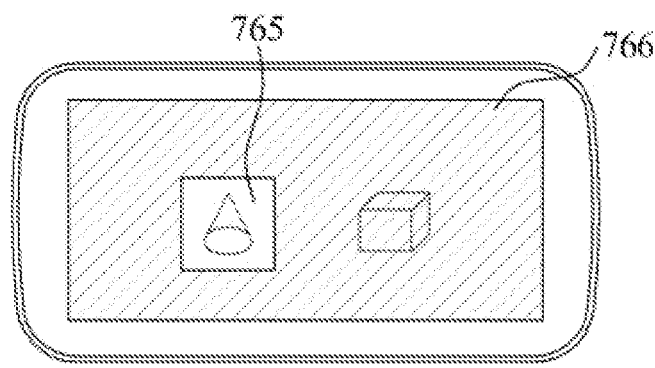

FIGS. 7F and 7G illustrate an example of an electronic device to designate a region of interest according to example embodiments.

Referring to FIGS. 7F and 7G, the user 1 may designate a region of interest 765 using an input of a drag gesture 764. The user 1 may input the drag gesture 764 for determining a boundary of the region of interest. The electronic device may determine the region of interest 765 having a corresponding boundary in response to the input drag gesture 764. The electronic device may display the determined region of interest 765 based on the optical display mode and may display a remaining region 766 based on a video display mode.

The aforementioned description relates to an example of displaying a region of interest based on an optical display mode and displaying a remaining region based on a video display mode. As another example, the electronic device may display the region of interest based on the video display mode and may display the remaining region based on the optical display mode. This example may be achieved by differently determining the region of interest. For example, in FIG. 7F, a region within the boundary may be determined as the remaining region 766 and a region outside the boundary may be determined as the region of interest 765.

Figure 7H:
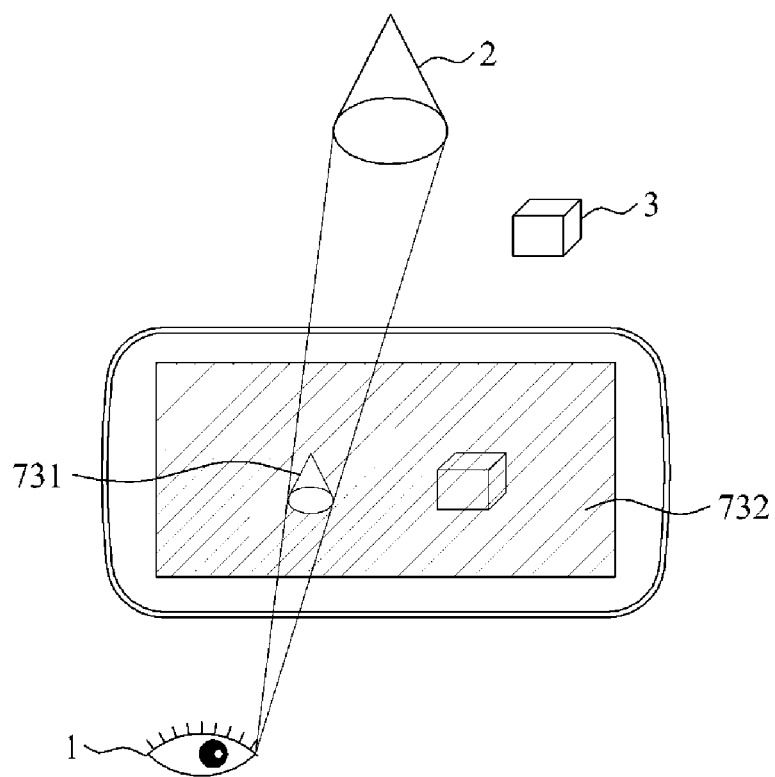

FIG. 7H illustrates another example of an electronic device to determine a region of interest according to example embodiments.

The electronic device may determine a point corresponding to a gaze of the user 1 by inward-photographing the gaze of the user 1. The electronic device may determine the point corresponding to the gaze of the user 1 as a region of interest 731 and may display the region of interest 731 based on an optical display mode. For example, referring to FIG. 7H, the electronic device may control no rendering data to be displayed on the region of interest 731. Alternatively, the electronic device may control an additional rendering effect to be applied and displayed on the region of interest 731.

The electronic device may display an image captured from a foreground on a remaining region 732. For example, the electronic device may control the remaining region 732 to be displayed based on a video display mode.

Figure 8:
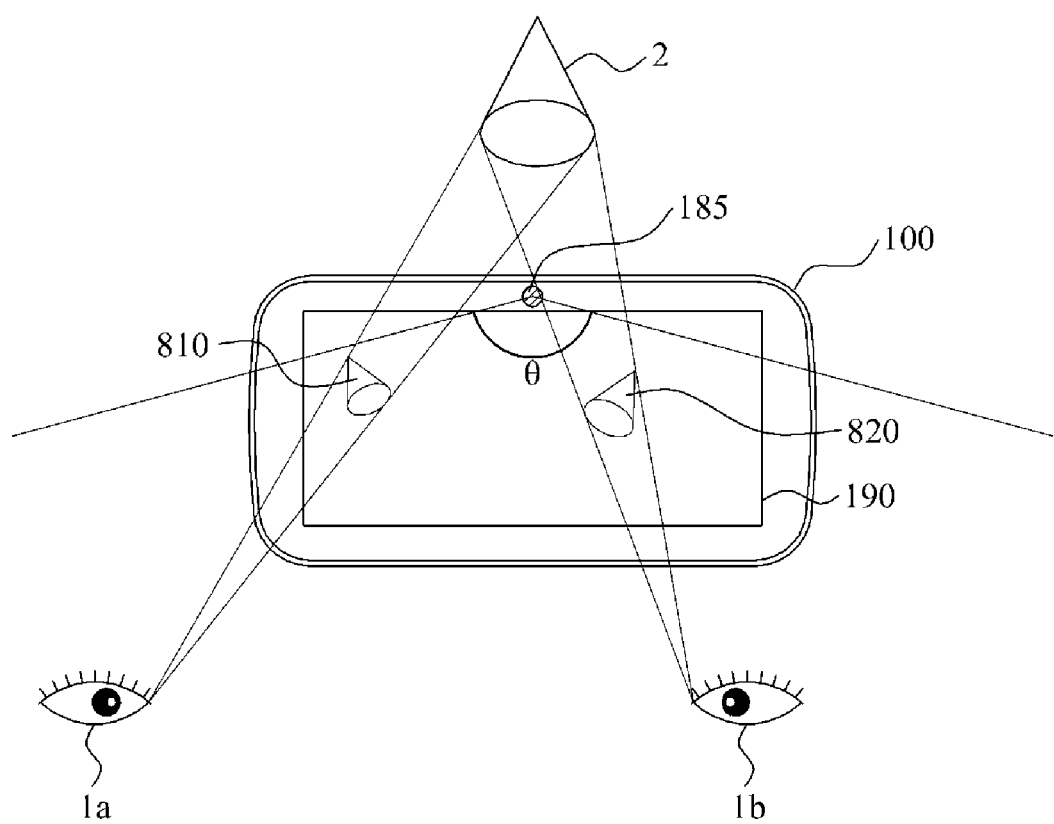
FIG. 8 illustrates an example of an electronic device according to example embodiments.

FIG. 8 illustrates an example of the electronic device 100 according to example embodiments.

Referring to FIG. 8, the object 2 may be disposed at the rear of the transparent display 190 provided in the electronic device 100. A user may observe the transparent display 190 at any one of a position 1a or a position 1b.

The inward-photographing unit 185 may photograph a gaze of the user. For example, the inward-photographing unit 185 may photograph a front of the electronic device 100 including the position 1a or the position 1b of the user. The controller 110 may determine the position 1a or the position 1b of the user from an image captured by the inward-photographing unit 185. The controller 110 may also determine the gaze of the user from an image captured by the inward-photographing unit 185. For example, the controller 110 may determine the gaze of the user based on a position of pupil of the user, a direction thereof, a position of the white/iris in the pupil of the user, and a position of a facial feature point.

For example, in the case of displaying an image of a video display mode, the controller 110 may correct a screen to be displayed on the transparent display 190 and may control the corrected screen to be displayed on the transparent display 190.

The controller 110 may match the gaze of the user and a gaze of an outward photographing unit, for example, an outward camera. For example, when the controller 110 determines that the user is positioned at the position 1a, the controller 110 may provide an image in which the object 2 is disposed to be relatively on a left side 810 of the transparent display 190. When the controller 110 determines that the user is positioned at the position 1b, the controller 110 may provide an image in which the object 2 is disposed to be relatively on a right side 820 of the transparent display 190. The controller 110 may correct an image of the object 2 captured by the outward-photographing unit and may create an image in which the object 2 is disposed to be relatively on the left or right of the transparent display 190. Technology of correcting a captured image as if the image has been captured on the relatively left or right is already widely known. Accordingly, a further detailed description related thereto will be omitted here.

The inward-photographing unit 185 may have a predetermined photographing angle 0. When the user is positioned outside the photographing angle 0, the controller 110 may output a notification message indicating that the user is deviated from a photographing range of the inward-photographing unit 185.

Figure 9:
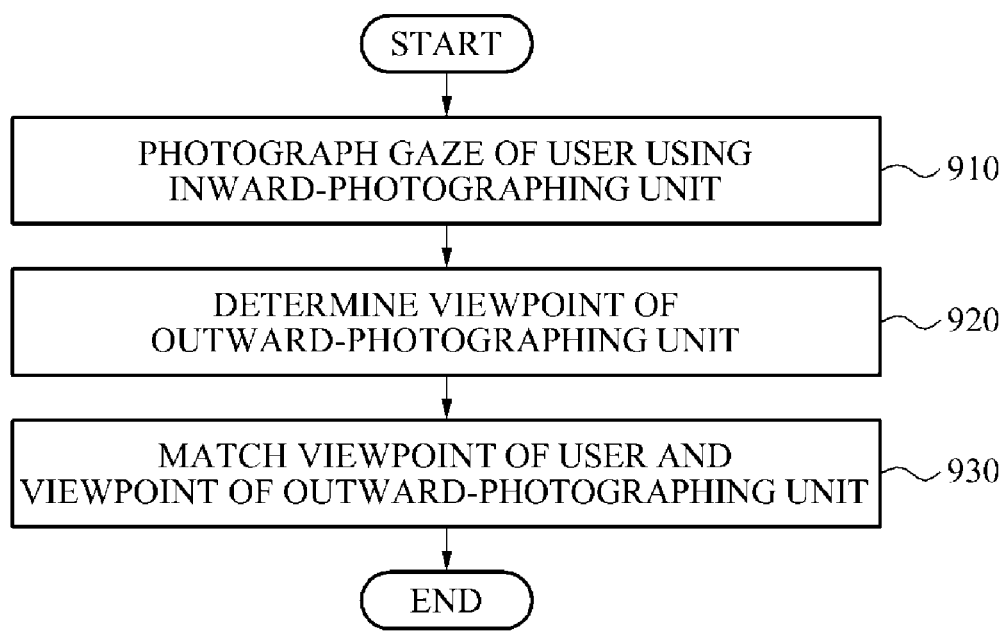
FIG. 9 is a flowchart illustrating a method of controlling an electronic device according to example embodiments.

FIG. 9 is a flowchart illustrating a method of controlling an electronic device according to example embodiments.

In operation 910, the electronic device may photograph a gaze of a user using an inward-photographing unit. For example, the inward-photographing unit may photograph a face of the user.

In operation 920, the electronic device may determine a viewpoint of an outward-photographing unit using a controller. For example, the controller may verify an image of the object captured by the outward-photographing unit.

In operation 930, the electronic device may match a viewpoint of the user and the viewpoint of the outward-photographing unit, using the controller. The controller may determine the viewpoint of the user based on an image captured from the face of the user. For example, the controller may determine the gaze of the user based on a position of pupil of the user, a direction hereof, a position of the white/iris in the pupil of the user, and a position of a facial feature point. Accordingly, the controller may determine at least one of a position and a direction of the viewpoint of the user.

The controller may correct the viewpoint of the outward-photographing unit based on the determined viewpoint of the user.

In the case of displaying a first image, the controller may determine a display position of an additional image associated with information on the object, based on the viewpoint of the user. The controller may determine an initial display position of the additional image based on an image of the object captured by the outward-photographing unit. The controller may correct the determined initial display position of the additional image based on the determined viewpoint of the user, and may control the corrected additional image to be displayed.

For example, the controller may determine, as a first position, a position at which the additional image is to be displayed on the transparent display, based on the image of the object captured by the outward-photographing unit. When an observation viewpoint of the user is determined to be directed from a left side towards a right side, the controller may determine a second position that is relatively left compared to the first position, as a display position of the additional image. Although an example in which the observation viewpoint of the user is directed from a left side towards a right side is described, it is only an example. Accordingly, example embodiments may be applied to various types of user viewpoints, such as an example in which an observation viewpoint of the user is determined to be directed from a right side towards a left side, an example in which an observation viewpoint of the user is determined to be directed from a lower side towards an upper side, an example in which an observation viewpoint of the user is determined to be directed from an upper side towards a lower side, or an example in which the above examples are mixed, for example.

In the case of displaying a second image, the controller may correct an image of the object based on a viewpoint of the user. Initially, the controller may acquire the image of the object captured by the outward-photographing unit. The controller may correct a display direction of the initially acquired image based on the determined viewpoint of the user, and may control the corrected image to be displayed.

For example, the controller may acquire an image of the object captured by the outward-photographing unit. The controller may determine a viewpoint of the outward-photographing unit as a first direction. When an observation viewpoint of the user is determined to be directed from a left side towards a right side, the controller may correct the image of the object as if the object is observed in a second direction corresponding to a clockwise rotated first direction. Although an example in which the observation viewpoint of the user is directed from a right side towards a left side is described, it is only an example. Accordingly, example embodiments may be applied to various types of user viewpoints, such as an example in which an observation viewpoint of the user is determined to be directed from a right side towards a left side, an example in which an observation viewpoint of the user is determined to be directed from a lower side towards an upper side, an example in which an observation viewpoint of the user is determined to be directed from an upper side towards a lower side, or an example in which the above examples are mixed, for example.

FIG. 10 is a flowchart illustrating a method of controlling an electronic device according to example embodiments.

In operation 1010, the electronic device may measure a distance between the electronic device and an object.

In operation 1020, the electronic device may photograph the object. That is, the electronic device may acquire an image of the object.

In operation 1030, the electronic device may determine a display ratio of the image of the object based on the distance between the electronic device and the object. The display ratio may indicate a level at which the image of the object is displayed.

The display ratio may be expressed by Equation 5.

Mixed image=$a$*(second display mode)+(1−$a$)* (first display mode)     [Equation 5]

In Equation 5, "a" denotes a weight and may be associated with the distance between the electronic device and the object.

Here, increasing the display ratio may indicate increasing a display level, for example, a display brightness of the image of the object.

In operation 1040, the electronic device may display the image based on the determined display ratio.

According to example embodiments, the electronic device may include a distance measurer configured to measure a distance between the electronic device and a first object, an outward-photographing unit configured to photograph the first object, a transparent display configured to allow light incident from the first object to pass and to display at least one image, and a controller configured to control an image of the first object captured by the outward-photographing unit to be displayed on the transparent display based on a display ratio that is determined based on the distance between the electronic device and the first object.

In this example, when the distance between the electronic device and the first object is less than a predetermined threshold, the controller may control the transparent display not to display the captured image. The controller may control the transparent display to display the captured image by increasing the display ratio of the captured image according to an increase in the distance between the electronic device and the first object.

In particular, the controller may determine the display ratio of the captured image according to Equation 6.

$a$*(captured image)+(1−$a$)*(incident light)     [Equation 6]

In Equation 6, "a" denotes the distance between the electronic device and the first object.

The electronic device may further include an inward-photographing unit configured to photograph a gaze of the user. The controller may determine a viewpoint of the user based on an image of an object captured by the inward-photographing unit, and may control a viewpoint of the outward-photographing unit and the viewpoint of the user to be matched.

According to example embodiments, an electronic device including a transparent display may include a distance measurer configured to measure a distance between the electronic device and a first object, a transparent display configured to allow light incident from the first object to pass and to display at least one image, and a controller configured to control a captured image to be displayed on the transparent display based on one of a plurality of display modes, based on the distance between the electronic device and the first object.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner.

The processing device may run an operating system (OS) and one or more software applications that run on the OS. The processing device may also access, store, manipulate, process, and create data in response to execution of the software.

For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. A method of controlling an electronic device having a transparent display, the method comprising:
controlling the electronic device in a providing of a first image through an optical display mode operation of the transparent display in which light incident from an object is transmitted;
controlling the electronic device to acquire a second image through a video display mode operation of the transparent display in which an image captured from the object is displayed; and
selectively displaying the first image and the second image using the transparent display by a mixing, by the electronic device, of the first image and the second image that takes into consideration predefined effects, of a distance between the electronic device and the object, on a perceived brightness of the object through the first image, the predefined effects being expected brightness perception changes with respect to distance changes based on transmittance characteristics of the transparent display.

2. The method of claim 1, further comprising controlling the electronic device to apply a rendering effect to the transparent display that provides the first image.

3. The method of claim 1, wherein the controlling of the electronic device to acquire the second image further comprises photographing the object.

4. The method of claim 1, further comprising controlling the electronic device to display an additional image associated with the object on the transparent display that provides the first image.

5. The method of claim 1, further comprising:
outward-photographing the object;
inward-photographing a gaze of a user; and
determining the gaze of the user based on an image captured through the inward-photographing, and controlling a viewpoint of the outward-photographing and a viewpoint of the user to be matched.

6. The method of claim 5, further comprising:
outputting a notification message when the gaze of the user is outside a predetermined inward-photographing range.

7. The method of claim 1, wherein the selective displaying of the first image and the second image further comprises displaying the first image on a region of interest of the transparent display and displaying the second image on a remaining region of the transparent display other than the region of interest.

8. The method of claim 7, further comprising:
receiving a designation of the region of interest from a user,
wherein the selective displaying of the first image and the second image further comprises displaying the first image on the designated region of interest.

9. The method of claim 7, further comprising:
inward-photographing a gaze of a user,
wherein the selective displaying of the first image and the second image further comprises determining a point corresponding to the gaze of the user as the region of interest.

10. The method of claim 1, further comprising measuring the distance between the electronic device and the object,
wherein the mixing includes mixing the first image and the second image to display the object based on a display ratio between the first image and the second image that is dependent on the measured distance, such that when the measured distance is greater than a first threshold distance the display ratio is controlling of the mixing so that only the second image is displayed or when the measured distance is less than a second threshold distance the display ratio is controlling of the mixing so that only the first image is displayed, where the first threshold distance is greater than the second threshold distance.

11. The method of claim 10, wherein the mixing includes increasing a display brightness of the second image when adjusting the display ratio for increasing a display level of the second image and decreasing a display brightness of the second image when adjusting the display ratio for increasing a display level of the first image.

12. A method of controlling an electronic device having a transparent display, the method comprising:
controlling the electronic device in a providing of a first image through an optical display mode operation of the transparent display in which light incident from an object is transmitted;
controlling the electronic device to acquire a second image through a video display mode operation of the transparent display in which an image captured from the object is displayed;
measuring the distance between the electronic device and the object; and
selectively displaying the first image and the second image using the transparent display by a mixing, by the electronic device, of the first image and the second image that that takes into consideration predefined effects, of the measured distance between the electronic device and the object, on a perceived brightness of the object through the first image,
wherein the mixing includes mixing the first image and the second image to display the object based on a display ratio between the first image and the second image that is dependent on the measured distance, such that when the measured distance is greater than a first threshold distance the display ratio is controlling of the mixing so that only the second image is displayed or when the measured distance is less than a second threshold distance the display ratio is controlling of the mixing so that only the first image is displayed, where the first threshold distance is greater than the second threshold distance.

13. The method of claim 12, wherein the mixing includes increasing a display brightness of the second image when adjusting the display ratio for increasing a display level of the second image and decreasing a display brightness of the second image when adjusting the display ratio for increasing a display level of the first image.

14. A method of controlling an electronic device having a transparent display, the method comprising:
- controlling the electronic device in a providing of a first image through an optical display mode operation of the transparent display in which light incident from an object is transmitted;
- controlling the electronic device to acquire a second image through a video display mode operation of the transparent display in which an image captured from the object is displayed; and
- selectively displaying the first image and the second image using the transparent display by a mixing, by the electronic device, of the first image and the second image,
- wherein the mixing includes selectively, based on expected perceived transmittance changes of the transparent display with respect to varying distances between the transparent display and exterior objects and that are dependent on transmittance characteristics of the transparent display, adjusting a display brightness of the first image and a display brightness of the second image based on a display ratio between the first image and the second image.

15. The method of claim 14, wherein the mixing includes increasing the display brightness of the second image when adjusting the display ratio for increasing a display level of the second image and decreasing the display brightness of the second image when adjusting the display ratio for increasing a display level of the first image, based on a determined distance between the transparent display and the object.

16. The method of claim 14, further comprising controlling the electronic device to apply a rendering effect to the transparent display that provides the first image,
- wherein the mixing includes selectively adjusting a display brightness of the rendering effect and the display brightness of the second image.

17. The method of claim 14, further comprising:
- measuring a distance between the electronic device and the object,
- wherein the selective displaying of the first image and the second image further comprises determining the display ratio based on the measured distance.

18. The method of claim 17, wherein the selective displaying of the first image and the second image further comprises increasing the displaying brightness of the second image according to an increase in the measured distance between the electronic device and the object and decreasing the display brightness of the second image according to a decrease in the measured distance between the electronic device and the object.

19. The method of claim 18, wherein the selective displaying of the first image and the second image further comprises displaying only the second image when the measured distance is greater than a first threshold distance and displaying only the first image when the measured distance is less than a second threshold distance, where the first threshold distance is greater than the second threshold distance.

20. A method of controlling an electronic device having a transparent display, the method comprising:
- controlling the electronic device in a providing of a first image through an optical display mode operation of the transparent display in which light incident from an object is transmitted;
- controlling the electronic device to acquire a second image through a video display mode operation of the transparent display in which an image captured from the object is displayed;
- selectively displaying the first image and the second image using the transparent display by a mixing, by the electronic device, of the first image and the second image that is dependent on a distance between the electronic device and the object; and
- measuring the distance between the electronic device and the object,
- wherein the selective displaying of the first image and the second image further comprises increasing the displaying brightness of the second image according to an increase in the measured distance between the electronic device and the object to decrease a perceived brightness of the object through the first image and decreasing the display brightness of the second image according to a decrease in the measured distance between the electronic device and the object to increase the perceived brightness of the object through the first image.

21. The method of claim 20, wherein the selective displaying of the first image and the second image further comprises displaying only the second image when the measured distance is greater than a first threshold distance and displaying only the first image when the measured distance is less than a second threshold distance, where the first threshold distance is greater than the second threshold distance.

22. A method of controlling an electronic device having a transparent display, the method comprising:
- controlling the electronic device in a providing of a first image through an optical display mode operation of the transparent display in which light incident from an object, disposed outside the electronic device, passes through the transparent display;
- controlling the electronic device to acquire a second image through a video display mode operation of the transparent display in which an image captured of another object, disposed outside the electronic device, is displayed, where the image of the other object is captured based on a user selection between the object and the other object, to select a region of interest, through a previous controlling of the electronic device in a providing of a previous first image through the optical display mode operation of the transparent display in which light incident from the object and the other object passed through the transparent display; and
- selectively displaying the first image and the second image using the transparent display by a mixing, by the electronic device, of the first image and the second image,
- wherein the selective displaying of the first image and the second image further comprises displaying, based on the selecting of the region of interest, the first image on the region of interest of the transparent display and displaying the second image on a remaining region of the transparent display other than the region of interest.

23. The method of claim 22, further comprising:
- receiving a designation of the region of interest from a user, indicating the selection between the object and the other object,
- wherein the selective displaying of the first image and the second image further comprises displaying the first image on the designated region of interest.

24. The method of claim 22, further comprising:
inward-photographing a gaze of a user; and
determining a point corresponding to the gaze of the user as the region of interest.

25. The method of claim 22, wherein the mixing includes selectively adjusting a display brightness of the first image and a display brightness of the second image based on a display ratio between the first image and the second image set to control effects of the display brightness of the second image on a perceived brightness of the object through the first image.

26. The method of claim 25, wherein the mixing includes increasing the display brightness of the second image when adjusting the display ratio for increasing a display level of the second image and decreasing the display brightness of the second image when adjusting the display ratio for increasing a display level of the first image.

27. The method of claim 25, further comprising controlling the electronic device to apply a rendering effect to the transparent display that provides the first image,
wherein the mixing includes selectively adjusting a display brightness of the rendering effect and the display brightness of the second image.

28. The method of claim 22, further comprising:
measuring a distance between the electronic device and the object,
wherein the selective displaying of the first image and the second image further comprises determining a display ratio based on the measured distance and transmittance of the transparent display.

29. The method of claim 28, wherein the selective displaying of the first image and the second image further comprises increasing the displaying brightness of the second image according to an increase in the measured distance between the electronic device and the object and decreasing the display brightness of the second image according to a decrease in the measured distance between the electronic device and the object.

30. The method of claim 29, wherein the selective displaying of the first image and the second image further comprises displaying only the second image when the measured distance is greater than a first threshold distance and displaying only the first image when the measured distance is less than a second threshold distance, where the first threshold distance is greater than the second threshold distance.

31. An electronic device, comprising:
a transparent display to provide a first image through an optical display mode operation of the transparent display in which light incident from an object passes through the transparent display, and to display at least one image;
an outward-photographing image sensor to photograph the object; and
a controller configured to acquire a second image through a video display mode operation of the transparent display in which the photograph is displayed, and to control the transparent display to selectively display the first image and the second image using the transparent display by mixing the first image and the second image through a selective adjusting of a display brightness of the second image based on predefined effects, of a distance between the electronic device and the object, on a perceived brightness of the object through the first image,
wherein the predefined effects are expected brightness perception changes with respect to distance changes based on transmittance characteristics of the transparent display.

32. The electronic device of claim 31, wherein the controller controls the transparent display to selectively display the first image and the second image by selectively adjusting the display brightness of the first image and the display brightness of the second image based on a display ratio between the first image and the second image.

33. The electronic device of claim 31, wherein the controller controls the transparent display to display the first image on a region of interest of the transparent display and to display the second image on a remaining region of the transparent display.

34. An electronic device, comprising:
a transparent display to provide a first image through an optical display mode operation of the transparent display in which light incident from an object passes through the transparent display, and to display at least one image;
an outward-photographing image sensor to photograph the object;
a distance measurer to measure a distance between the electronic device and the object; and
a controller to selectively display, on the transparent display, the first image and a second image based on a stored image display operation of the transparent display, in which the photograph is displayed, by mixing the first image and the second image based on a display ratio between the first image and the second image that is determined based on the measured distance between the electronic device and the object,
wherein the display ratio represents a first weighting of the first image and a second weighting of the second image to control, in the mixing, to what extent the first image and the second image are mixed, and
wherein, when the measured distance is greater than another measured distance previously measured for a displaying of both a corresponding first image and corresponding second image, the second weighting is greater than the first weighting to increase an extent of the second image over an extent of the first image in the mixing of the first image and the second image, compared to a previous second weighting that was not greater than a previous first weighting in the displaying of both the corresponding first image and the corresponding second image.

35. The electronic device of claim 34, wherein the mixing includes selectively adjusting a display brightness of the first image and a display brightness of the second image based on the display ratio between the first image and the second image.

36. The electronic device of claim 35, wherein the selective displaying of the first image and the second image includes controlling the electronic device to apply a rendering effect to the transparent display that provides the first image,
wherein the mixing includes selectively adjusting a display brightness of the rendering effect and a display brightness of the second image to control a perceived brightness of the first image.

37. The electronic device of claim 34, wherein when the measured distance is greater than a first threshold distance the display ratio is controlling of the mixing so that only the second image is displayed.

* * * * *